(12) United States Patent
Shi et al.

(10) Patent No.: US 12,058,136 B2
(45) Date of Patent: Aug. 6, 2024

(54) SECURED METADATA SHARING AMONG VNFs

(71) Applicant: Huawei Technologies Co., Ltd., Shenzhen (CN)

(72) Inventors: Hang Shi, Fremont, CA (US); Yinghua Ye, Los Gatos, CA (US); Yewei Tang, San Ramon, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 583 days.

(21) Appl. No.: 17/227,053

(22) Filed: Apr. 9, 2021

(65) Prior Publication Data

US 2021/0234861 A1 Jul. 29, 2021

Related U.S. Application Data

(63) Continuation of application No. PCT/CN2019/110094, filed on Oct. 9, 2019.

(Continued)

(51) Int. Cl.
*H04L 29/06* (2006.01)
*G06F 9/455* (2018.01)
(Continued)

(52) U.S. Cl.
CPC .............. *H04L 63/10* (2013.01); *G06F 9/455* (2013.01); *G06F 16/2255* (2019.01)

(58) Field of Classification Search
CPC ....... H04L 63/10; G06F 16/2255; G06F 9/455
See application file for complete search history.

(56) References Cited

U.S. PATENT DOCUMENTS 9,852,146 B1 * 12/2017 Bent .................... G06F 16/1774
10,523,733 B1 * 12/2019 Bharrat ............... H04L 65/1069
(Continued)

FOREIGN PATENT DOCUMENTS

CN 106657279 A 5/2017
WO WO-2016204903 A1 12/2016
WO WO-2020083026 A1 4/2020

OTHER PUBLICATIONS

"International Application No. PCT/CN2019/110094, International Search Report and Written Opinion mailed Dec. 30, 2019", (Dec. 30, 2019), 6 pgs.

(Continued)

*Primary Examiner* — Joseph P Hirl
*Assistant Examiner* — Chi D Nguy
(74) *Attorney, Agent, or Firm* — Schwegman Lundberg & Wossner, P.A.

(57) ABSTRACT

A system and method for securely sharing metadata among virtualized network functions (VNFs) disposed within a cluster of host computers includes a distributed forwarding and metadata sharing (DFMS) framework that forwards received data packets and provides remote direct memory access (RDMA) enabled sharing of secured metadata among the VNFs from more than one host computer in the cluster of host computers, and a DFMS controller that resides in the cluster of host computers as a VNF and registers VNFs in the cluster to at least one group of VNFs in the cluster and assigns access rights to the metadata of VNFs within respective groups of VNFs in the cluster. In operation, each registered VNF in a group in the cluster uses RDMA requests to access the metadata for other registered VNFs in the group in the cluster to which the each registered VNF in the group has access rights.

20 Claims, 10 Drawing Sheets

Related U.S. Application Data

(60) Provisional application No. 62/749,256, filed on Oct. 23, 2018.

(51) Int. Cl.
    *G06F 16/22*     (2019.01)
    *H04L 9/40*     (2022.01)

(56) References Cited

U.S. PATENT DOCUMENTS

| | | | |
|---|---|---|---|
| 11,507,404 B2* | 11/2022 | Yang | H04L 69/163 |
| 2016/0182378 A1* | 6/2016 | Basavaraja | H04L 47/125 |
| | | | 370/235 |
| 2017/0142206 A1 | 5/2017 | Kodaypak et al. | |
| 2018/0375762 A1* | 12/2018 | Bansal | G06F 9/45558 |
| 2019/0089635 A1* | 3/2019 | Bansal | H04L 63/166 |
| 2020/0050576 A1* | 2/2020 | Rangachari | G06F 15/17331 |
| 2020/0314694 A1* | 10/2020 | Yu | H04L 49/70 |

OTHER PUBLICATIONS

"Network Functions Virtualisation (NFV); Continuous Development and Integration; Report on use cases and recommendations for VNF Snapshot", ETSI, ETSI GR NFV-TST 005 V3.1.1 (Mar. 2017), (Mar. 2017), 58 pgs.

\* cited by examiner

SECURED METADATA SHARING AMONG VNFs

CROSS-REFERENCE TO RELATED APPLICATIONS

This application is a continuation application of International Application No. PCT/CN2019/110094, filed Oct. 9, 2019, which claims the benefit of priority to U.S. Provisional Application No. 62/749,256, filed on Oct. 23, 2018, entitled "Secured Metadata Sharing Among VNFs," the benefit of priority of each of which is claimed herein, and which applications and publication are hereby incorporated herein by reference in their entirety.

TECHNICAL FIELD

This application is directed to a system and method to enable secured metadata sharing among virtualized network functions (VNFs) in a cloud native environment including clusters of host computers and, more particularly, to a distributed forwarding and metadata sharing (DFMS) framework that provides remote direct memory access (RDMA) enabled sharing of secured metadata among the VNFs from more than one host computer in a cluster of host computers.

BACKGROUND

Cloud native based architecture has been widely accepted in the telecommunications industry for mobile core networks. Announced 5G mobile core networks will use cloud native microservice architecture, where virtual network functions are implemented in the format of microservices. Further, in GiLAN (i.e., the internet-facing interface of a 3G gateway (GGSN) is referred to as "Gi" in 3GPP specifications, and the network beyond the PDN Gateway is called GiLAN, where operators deploy services) services or services hosted in mobile edge computing (MEC), cloud native based models are deployed as well. In such cloud native architectures, multi-tenants will be supported.

Cloud native based infrastructure has gained great momentum with the introduction of microservices. Microservices allow applications to break down into smaller, composable pieces that work together and that are easy to develop and maintain. The common implementation method for microservices uses containers. Containerization is an operating system feature where the kernel allows the existence of multiple isolated user-space instances. Such instances, called containers, look like real computers from the point of view of the programs running on them. However, programs running inside a container can only see the container's contents and devices assigned to the container.

As shown in FIG. 1, conventional machine virtualization often includes running a hypervisor 100 on hardware infrastructure 102 to create virtual machines for running guest operating systems OS1, OS2, and OS3 104. Respective applications App1, App2, and App3 106 operate on the respective operating systems 104 and utilize respective bins or libraries Lib1, Lib2, Lib3 108 that are made available to the respective applications App1, App2, and App3 106 by the respective operating systems OS1, OS2, OS3 104. In operation, the respective operating systems 104 may allow or deny access to the resources based on which program requests them and the user account in the context of which the operating system runs. The operating system 104 generally manages access to the resources made available by respective virtual machines on the hypervisor 100.

On the other hand, in the case of containers, as also shown in FIG. 1, a container engine 110 runs on the operating system 112 that, in turn, manages access to hardware resources 114. The container engine 110 creates respective containers for running application programs and only parts of the system resources are allocated to each container. An application program App1, App2, and App3 116 running inside a container can only see the allocated resources such as the respective libraries Lib1, Lib2, Lib3 118 made available to the respective applications 116 within the assigned container. Several containers can be created on each operating system to which a subset of the computer's resources is allocated. Each container may contain any number of computer programs that run concurrently or separately and may or may not interact with each other. In typical scenarios, programs are separated into separate containers to improve security, hardware independence, and to improve resource management. For example, in Policy Control and Enforcement Function (PCEF) and GiLAN at the mobile packet core network, it is required for packets to go through traffic enforcement of a few functions, one form of which can be done via service chain composed of a few containers.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

In cloud native based infrastructure environments, it is desired for the evolved packet core to include virtualized network functions (VNFs) that can share metadata to improve performance. In particular, a new approach is desired that permits VNFs to share metadata even when the VNFs are located on different computers in different containers and owned by different tenants in a multi-tenant network. In the embodiments described herein, the metadata does not move along with the packets. Instead, the metadata is written from/read to group-based memory by the relevant VNF. The systems and methods described herein create a mechanism to securely share, with minimal overhead, the metadata among a trusted VNF group even when the VNFs in a VNF group are located on different hosts within a cluster of computers and the VNF group is either in the form of containers or virtual machines (VMs). Sample embodiments are described with respect to containers, but it will be appreciated that the techniques described herein will work on VMs as well.

According to a first aspect of the present disclosure, there is provided an apparatus for securely sharing metadata among virtualized network functions (VNFs) disposed within a cluster of host computers. The apparatus includes a distributed forwarding and metadata sharing (DFMS) framework that forwards received data packets and provides remote direct memory access (RDMA) enabled sharing of secured metadata among the VNFs from more than one host computer in the cluster of host computers and a DFMS controller that resides in the cluster of host computers as a VNF and registers VNFs in the cluster to at least one group of VNFs in the cluster and assigns access rights to the metadata of VNFs within respective groups of VNFs in the cluster. In sample embodiments, each registered VNF in a group in the cluster uses RDMA requests to access the metadata for other registered VNFs in the group in the cluster to which the each registered VNF in the group has access rights.

According to a second aspect of the present disclosure, there is provided a method of providing RDMA enabled sharing of secured metadata among VNFs from more than one host computer in a cluster of host computers. The method includes a metadata controller registering VNFs in the cluster to respective groups of VNFs in the cluster based on respective features of each VNF in the respective groups in the cluster and assigning access rights to the metadata of VNFs within respective groups of VNFs in the cluster. Upon receiving a data packet, the data packet is forwarded to a VNF and metadata for the data packet is written for shared access by other VNFs in a group of VNFs to which the VNF is registered. In a sample embodiment, writing the metadata comprises using an RDMA metadata write request to the group of VNFs in the cluster.

According to a third aspect of the present disclosure, there is provided a non-transitory computer-readable medium storing computer instructions to provide RDMA enabled sharing of secured metadata among VNFs from more than one host computer in a cluster of host computers. When executed by one or more processors, the instructions cause the one or more processors to perform the steps of registering VNFs in the cluster to respective groups of VNFs in the cluster based on respective features of each VNF in the respective groups in the cluster and assigning access rights to the metadata of VNFs within respective groups of VNFs in the cluster. Upon receiving a data packet, the data packet is forwarded to a VNF and metadata for the data packet is written for shared access by other VNFs in a group of VNFs to which the VNF is registered. In sample embodiments, writing the metadata comprises using an RDMA metadata write request to the group of VNFs in the cluster.

In a first implementation of any of the preceding aspects, the VNFs within a cluster are implemented in containers running on different host computers within the cluster.

In a second implementation of any of the preceding aspects, the DFMS controller assigns different access rights to respective VNFs of a group of registered VNFs in the cluster to the metadata of the group of registered VNFs in the cluster.

In a third implementation of any of the preceding aspects, the DFMS controller assigns access rights to the metadata of the group of registered VNFs in the cluster when a second VNF is registered to the group of VNFs in the cluster by the DFMS controller.

In a fourth implementation of any of the preceding aspects, the DFMS controller generates a VNF key for a registered VNF in the group in the cluster, encodes a memory pointer for metadata allocated for the registered VNF in the group in the cluster using the VNF key, and sends an encoded metadata pointer to the registered VNF for use in requesting metadata access. In sample embodiments, the VNF key is a random key generated for each VNF and known only by the DFMS controller.

In a fifth implementation of any of the preceding aspects, the DFMS framework identifies metadata for a VNF using an encoded metadata pointer provided by the VNF.

In a sixth implementation of any of the preceding aspects, the encoded metadata pointer comprises at least one of (1) a hashed value of a real pointer to the metadata and the VNF key assigned to the VNF, or (2) an exclusive OR function of the VNF key for the VNF and the real pointer to the metadata.

In a seventh implementation of any of the preceding aspects, the DFMS controller registers VNFs in the cluster having shared features to a same group and provides each registered VNF in the same group with a same group ID.

In an eighth implementation of any of the preceding aspects, the DFMS framework creates different VNF groups within a cluster, manages VNF group membership based on administrative properties, and adds a VNF to at least one of the VNF groups based on features shared with the at least one of the VNF groups.

In a ninth implementation of any of the preceding aspects, the DFMS controller requests that the DFMS framework create a group and provides group membership information, access right information, and memory size for metadata to the DFMS framework for the group to be created.

In a tenth implementation of any of the preceding aspects, the DFMS framework creates a table entry for each group, the table entry including a group ID, an index, a memory size, group membership, and permission for the group.

In an eleventh implementation of any of the preceding aspects, the DFMS controller registers VNFs from a same tenant within the cluster to a same VNF group.

In a twelfth implementation of any of the preceding aspects, the DFMS controller registers the VNF with more than one group of VNFs based on respective features of the respective groups of VNFs that are shared by the VNF.

In a thirteenth implementation of any of the preceding aspects, writing the metadata comprises receiving from the VNF a request to obtain an encoded pointer for the VNF, decoding the encoded pointer to extract a real pointer to the metadata for the group of VNFs in the cluster, determining that the VNF has access rights to the metadata of the group of VNFs in the cluster, and enabling the VNF to write the metadata for access by the group of VNFs at an address pointed to by the real pointer.

In a fourteenth implementation of any of the preceding aspects, another VNF in the group of VNFs in the cluster accesses the metadata stored at the address pointed to by the real pointer by providing a metadata read request including a group ID of the group of VNFs in the cluster, a VNF ID for the another VNF, and the encoded pointer, wherein the encoded pointer is decoded to extract the real pointer to the metadata.

In a fifteenth implementation of any of the preceding aspects, decoding the encoded pointer comprises extracting the encoded pointer from the data packet and decoding the encoded pointer using a VNF key assigned to the VNF by the metadata controller, wherein the VNF key is a random key generated for the VNF that is known only by the metadata controller.

As described in the detailed description below, such apparatus and methods create a mechanism to securely share, with minimal overhead, the metadata among a trusted VNF group even when the VNFs in a VNF group are located on different hosts within a cluster of computers.

The method can be performed and the instructions on the computer readable media may be processed by the apparatus, and further features of the method and instructions on the computer readable media result from the functionality of the apparatus. Also, the explanations provided for each aspect and its implementation apply equally to the other aspects and the corresponding implementations. The different embodiments may be implemented in hardware, software, or any combination thereof. Also, any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

It should be understood at the outset that although an illustrative implementation of one or more embodiments are provided below, the disclosed systems and/or methods described with respect to FIGS. 2-12 may be implemented using any number of techniques, whether currently known or in existence. The disclosure should in no way be limited to the illustrative implementations, drawings, and techniques illustrated below, including the example designs and implementations illustrated and described herein, but may be modified within the scope of the appended claims along with their full scope of equivalents.

In cloud native based architecture environments, if virtualized network functions (VNFs) from the same owner could share metadata (e.g., timestamps, protocols, application types, etc.), it would greatly simplify the decomposition process of applications. For example, packet classification information is used by multiple VNFs (firewall and antivirus). If the classification results could be shared among VNFs, unnecessary redundant efforts at the respective VNFs could be avoided. It is desired to enable VNFs to share metadata to improve performance. However, to date, such metadata sharing has not been possible in cloud native microservice infrastructure and other virtualized environments as there is no mechanism for secure metadata sharing across different hosts and different tenants in a network.

Existing VNF solutions include hash table based, in-band operations, administration, and management (OAM), and a packet framework that injects metadata for each packet. However, each of these approaches has significant limitations.

In the hash table-based approach, a VNF can change packets, but the hash keys of the VNFs do not remain constant. Also, the hash table-based approach is memory hungry and has scalability issues. Further, while the hash table-based approach provides a method for a Packet Framework (PF) to observe some of the VNFs behaviors, it does not allow VNFs to share metadata.

In-band OAM enables a VNF to put metadata into a packet header, but it has scalability issues. Also, switches and routers may not support the option field and drop the packets.

Similar to the hash table-based approach, the existing metadata approach provides another method for the PF to observe VNF behaviors, but it also does not allow VNFs to share metadata. Moreover, the metadata information can get lost during buffer conversion (e.g., Mbuff ↔ Socket buffer). An improved metadata approach is desired.

Figure 1:
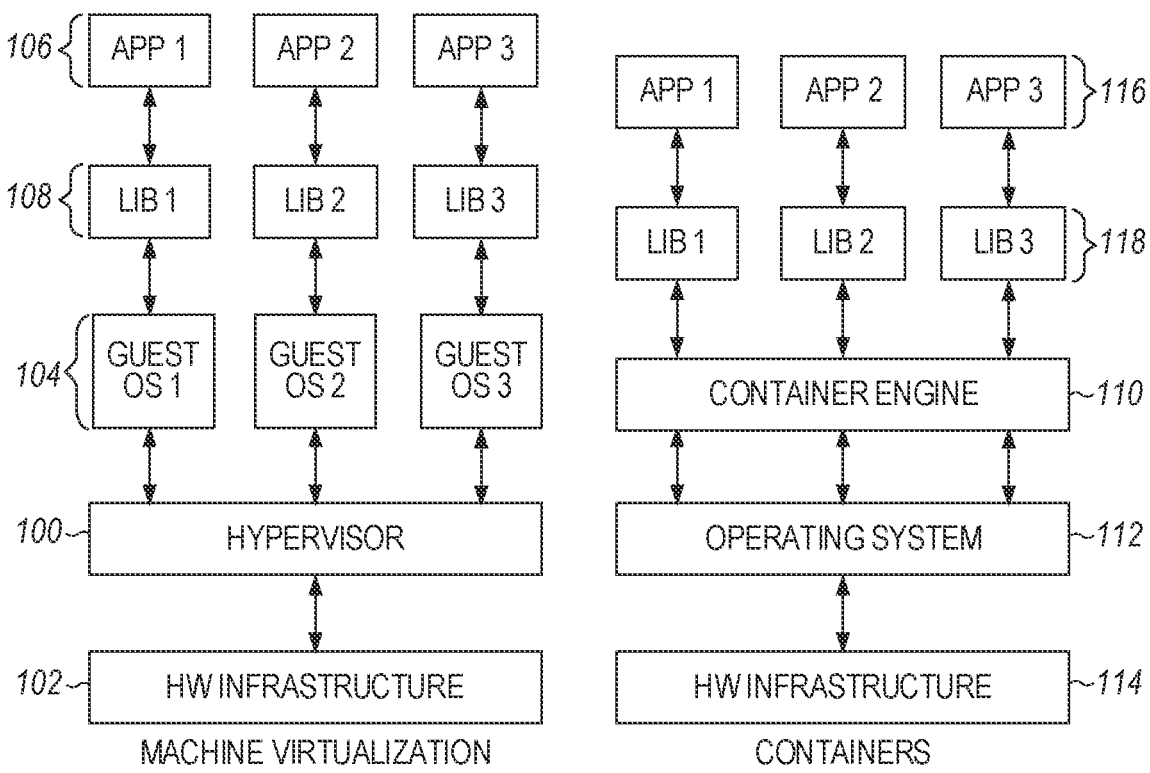
FIG. 1 illustrates a diagram of the architectures of conventional machine virtualization versus containers.
Figure 2:
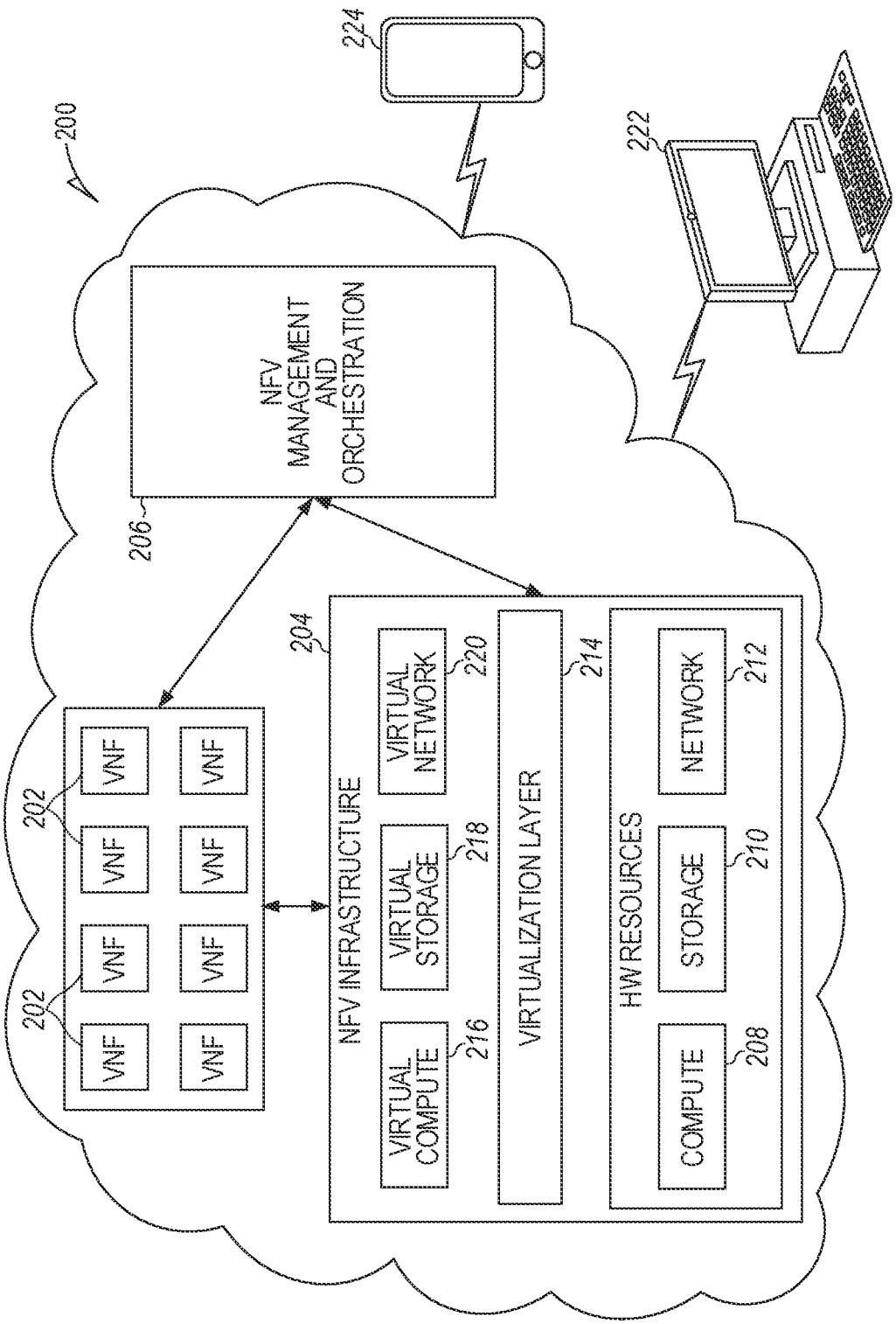
FIG. 2 illustrates a high-level network function virtualization (NFV) architectural framework for creating and managing VNF instances in a sample network embodiment.

FIG. 2 illustrates a high-level network function virtualization (NFV) architectural framework 200 (e.g., ETSI GS NFV 002) for creating and managing VNF instances 202 in a sample network embodiment. A major change brought by NFV is that virtualization enables additional dynamic methods in addition to static ones for constructing and managing network function graphs or sets combining the network functions. A major focus of NFV is to enable and to exploit the dynamic construction and management of network function graphs or sets and their relationships regarding their associated data, control, management, dependencies, and other attributes. 5G network infrastructure is implemented using a diverse set of non-virtualized and/or virtualized network functions and takes advantage of the dynamic nature of NFV to decouple software from hardware, provide a flexible network function deployment, and dynamic operation of the network.

FIG. 2 further illustrates the three main working domains in NFV: the virtualized network functions (VNFs) 202, which are the software implementations of network functions, the NFV Infrastructure 204 that supports the execution of the VNFs 202, and the NFV Management and Orchestration module 206, which includes provisioning modules that provide the orchestration and lifecycle management of hardware and/or software resources that support the infrastructure virtualization and the lifecycle management of the VNFs 202. The NFV reference architecture 200 supports a wide range of services described as forwarding graphs that describe the relations existing between VNFs 202. This is accomplished by orchestrating the VNF deployment and operation across diverse computing 208, storage 210, and networking 212 hardware resources. In FIG. 2, the computing hardware resources 208 and storage hardware resources 210 are commonly pooled and interconnected by networking hardware resources 212. A virtualization layer 214 virtualizes the hardware resources to create the NFV infrastructure 204 including virtual computing resources 216, virtual storage resources 218, and virtual networking resources 220 needed to support the execution of the VNFs 202. Other network resources interconnect the VNFs 202 with external networks and non-virtualized functions, enabling the integration of existing technologies with virtualized network functions. Customer computer devices 222 and mobile devices 224 may communicate end-to-end across the network using chains of VNFs 202.

Figure 3:
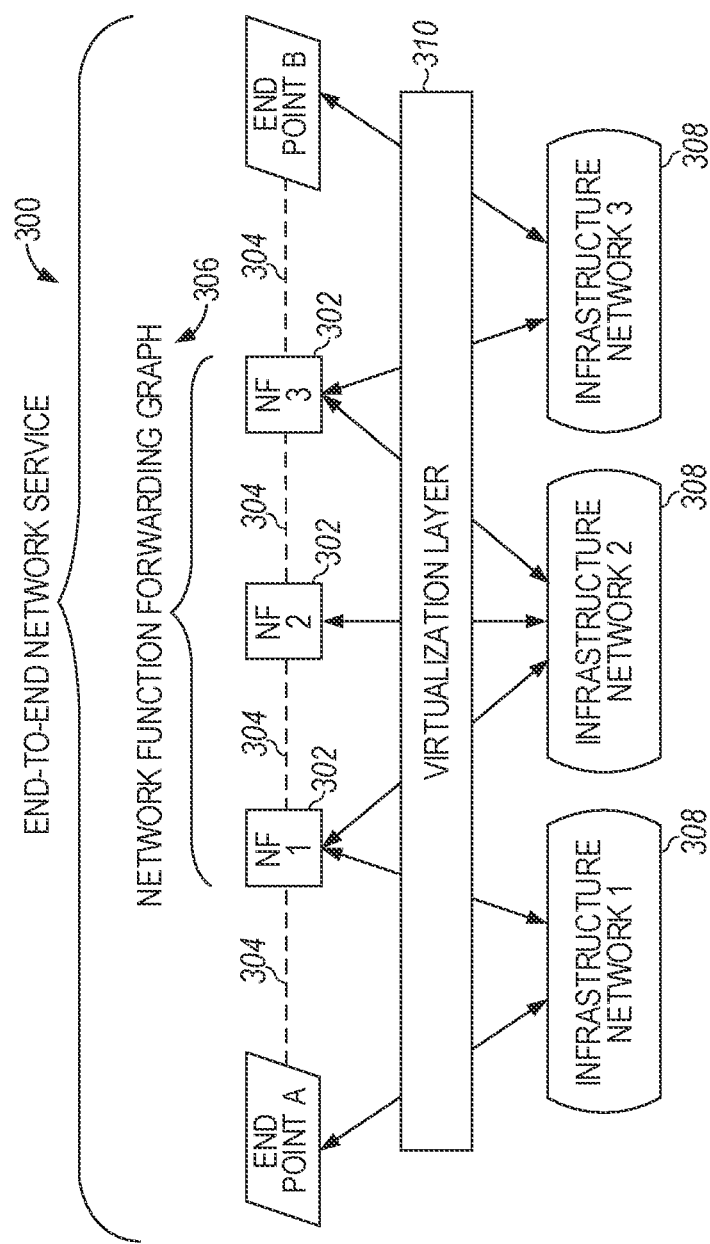
FIG. 3 illustrates a diagram of an end-to-end network service including network function block nodes interconnected by logical links in a sample network embodiment.

FIG. 3 illustrates a diagram of an end-to-end network service 300 including network function block nodes 302 interconnected by logical links 304 to connect endpoint A to endpoint B in a sample network embodiment. In the context of FIG. 3, the end-to-end network service 300 may be viewed architecturally as a forwarding graph 306 of Network Functions (NFs) 302 interconnected by supporting network infrastructure 308. These network functions may be implemented in a single operator network or used between different operator networks. The network service behavior is a combination of the behavior of the respective functional blocks, which can include individual NFs, sets of NFs, NF forwarding graphs 306, and/or the infrastructure networks 308. In the illustrated embodiment, the infrastructure networks implement a virtualization layer 310 using techniques such as containerization or virtual machines. The virtualization layer 310, in turn, supports virtualization of the NFs as VNFs as described herein.

In the network service 300, the endpoints and network functions of the network service are represented as nodes and correspond to devices, applications, and/or physical server applications. An NF forwarding graph 306 can have network function nodes 302 connected by logical links 304 that can be unidirectional, bi-directional, multi-cast, and/or broadcast. A simple example of a forwarding graph is a chain of network functions. An example of such an end-to-end network service can include a smartphone, a wireless network, a firewall, a load balancer, and a set of servers. The NFV activity is conducted within the operator-owned resources whereby a customer-owned device, such as PC 222 or smartphone 224 is outside of the network 300, as the operator cannot control the customer-owned devices.

The network service 300 in FIG. 3 includes a nested NF forwarding graph 306 including network function block nodes 302 connected by logical links 304. The endpoints A and B are connected to the network functions via the network infrastructure (wired and/or wireless) to provide a logical interface between the endpoints A and B and a network function. The logical interfaces are represented in FIG. 3 by dotted lines. In this example, the NF forwarding graph 306 includes network functions NF1, NF2, and NF3 302, which may be virtualized as previously noted. The network functions are interconnected via logical links provided by the infrastructure network 308.

In the network service 300 of FIG. 3, virtualization may be realized by the virtualization layer 310 that abstracts the hardware resources of the NFV infrastructure network 308. In such a configuration, the VNFs 202 would replace the NFs 302 and run on top of the virtualization layer 310, which is part of the NFVI 204 as described above with respect to FIG. 2. A VNF instance may be implemented on different physical resources (e.g., computer resources, containers, and hypervisors) and may be geographically dispersed as long as the overall end-to-end service performance and other policy constraints are met. However, since a VNF may have a per-instance capacity that is less than that of a corresponding physical network function on dedicated hardware, the workload of a VNF may be split across many distributed or clustered VNF instances. Such virtualization, distribution, and clustering make performance enhancement through sharing of metadata impossible without a mechanism to share the metadata among a trusted VNF group, even when the VNFs in a VNF group are located on different hosts within a cluster of computers, and the VNFs in the VNF group are implemented either in the form of containers or virtual machines (VMs). The apparatus and method described herein provide such a mechanism.

Figure 4:
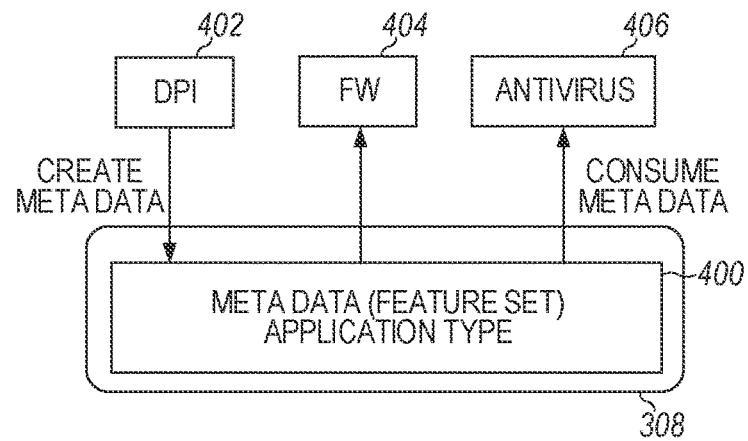
FIG. 4 illustrates a conceptual diagram of metadata sharing amongst VNFs in a sample embodiment.

FIG. 4 illustrates a conceptual diagram of metadata sharing amongst VNFs in a sample embodiment. In general, the concept is that the infrastructure network 308 includes virtualizable storage 400 for storing a feature set of metadata to be shared by VNFs that are granted access rights to the virtual storage 400 including the metadata. In the example illustrated, a first VNF 402 implements deep packet inspection (DPI) and creates metadata that is stored in virtual storage 400 of the infrastructure network 308. As illustrated, VNF 404 implements a firewall (FW) and VNF 406 implements antivirus software that may access virtual storage 400 to access and to consume the metadata. For this process to work, the VNFs are grouped and registered in the same VNF group and access to the virtual memory 400 is managed to enable secure access across a cluster of computers, which as noted above, may be geographically dispersed.

Figure 5:
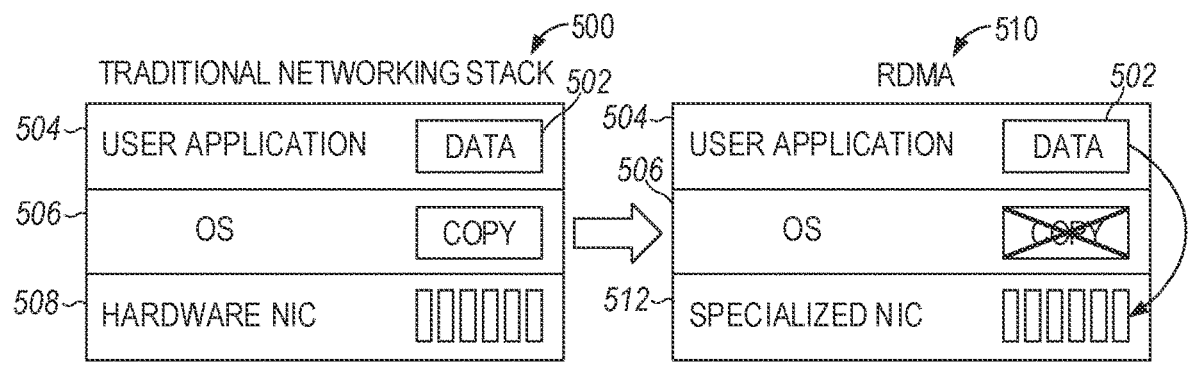
FIG. 5 illustrates a conceptual diagram of a remote direct memory access (RDMA) mechanism for enabling metadata sharing among host machines in a sample embodiment.

One implementing technology for providing such features is remote direct memory access (RDMA). RDMA has been considered as a key enabling technology to connect multiple server nodes to form a cluster given its low latency and low CPU utilization capabilities. As shown in FIG. 5, unlike a traditional network stack 500, where the data 502 from a user application 504 is copied by the operating system 506 to the kernel residing on hardware network interface card (NIC) 508, RDMA 510 bypasses copying by the operating system 506 to the kernel and supports a zero copy transfer from virtual memory on one node to virtual memory on another node. A specialized NIC 512 is used for such transfers. By virtue of the direct transfer, low latency transmission is achieved. RDMA is thus a good candidate to facilitate sharing of metadata amongst VNFs in a cluster where multiple host machines are used, irrespective of their geographic location.

As noted above, in cloud native architecture, VNFs are implemented on virtual machines or in the form of containers. In the case of containers, the containers may be executing on any of the physical hosts. The systems and methods described herein enable metadata sharing among VNFs implemented in containers across different hosts within a cluster. The systems and methods described herein also recognize that one cluster can host VNFs from different tenants, so the platform is designed to make sure the metadata from one tenant cannot be accessed by other tenants without appropriate access rights. Also, even for VNFs belonging to the same tenant, they can be assigned different access rights for a given metadata feature set.

Figure 6:
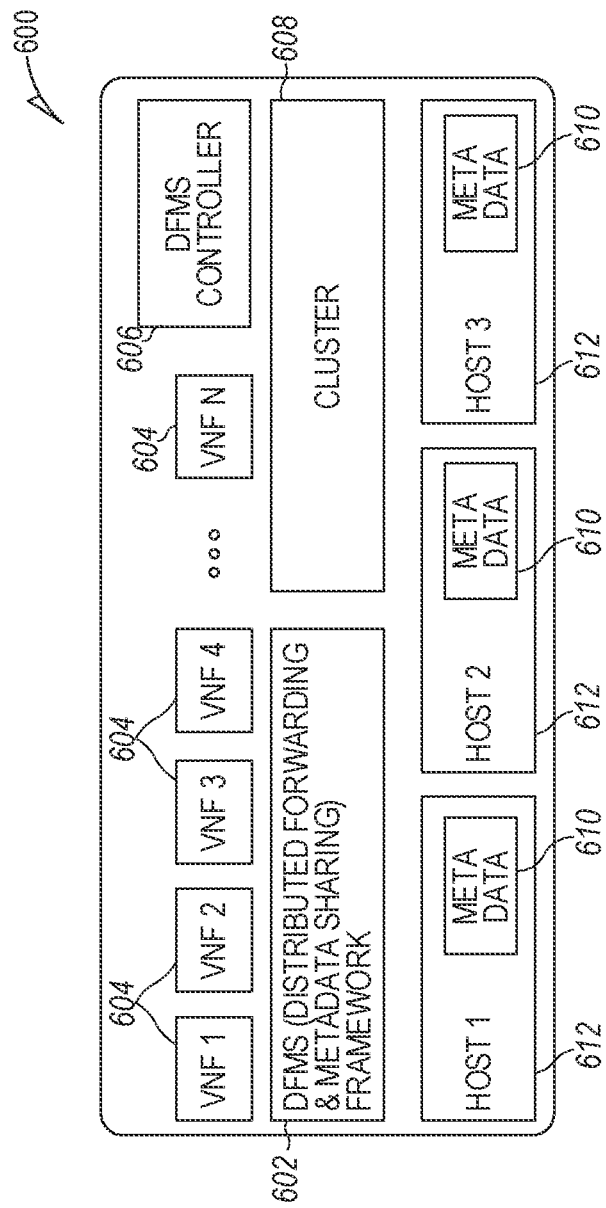
FIG. 6 illustrates a block diagram of a secured VNF metadata sharing apparatus in a sample embodiment.

In sample embodiments, a distributed forwarding and metadata sharing (DFMS) framework and DFMS controller (DFMSC) provide access right based metadata sharing while guaranteeing sharing among VNFs from different tenants while addressing both performance and latency requirements. FIG. 6 illustrates a block diagram of a secured VNF metadata sharing apparatus 600 in a sample embodiment. DFMS framework 602 supports packet forwarding and secured distributed metadata sharing among VNFs 604. DFMS framework 602 provides two types of APIs to VNFs 604: a Write-to-metadata request and a Read-to-metadata request. These requests enable indirect communications among VNFs 604 via the DFMS framework 602 and achieve effective metadata sharing, as will be described in more detail below. DFMS Controller 606 is a Network Function Controller (NFC) that resides in any node inside the cluster 608 as a VNF. DFMS Controller 606 functions to register VNFs 604 to a packet framework (PF), to create different VNF groups based on various administrative properties, and to add VNFs 604 to the VNF groups based on their shared features. For example, VNFs 604 from the same tenant may be classified into one VNF group. DFMS 602 also manages metadata access rights by the VNFs 604 in a VNF group and provides RDMA enabled memory management to provide secure access to the metadata 610 stored on different hosts (e.g., Host 1, Host 2, Host 3) in the cluster 608.

As illustrated in FIG. 6, the metadata 610 is stored in virtual memory of different host nodes 612 upon which the containers in the clusters of VNFs 608 are implemented. In a simple example, RDMA is used to connect three nodes to form a cluster. RDMA is used to let RDMA enabled virtual memory in each host node 612 appear as one virtual memory for the VNFs 604 in the cluster 608. The metadata 610 is stored in RDMA enabled virtual memory of the host nodes 612.

Figure 7:
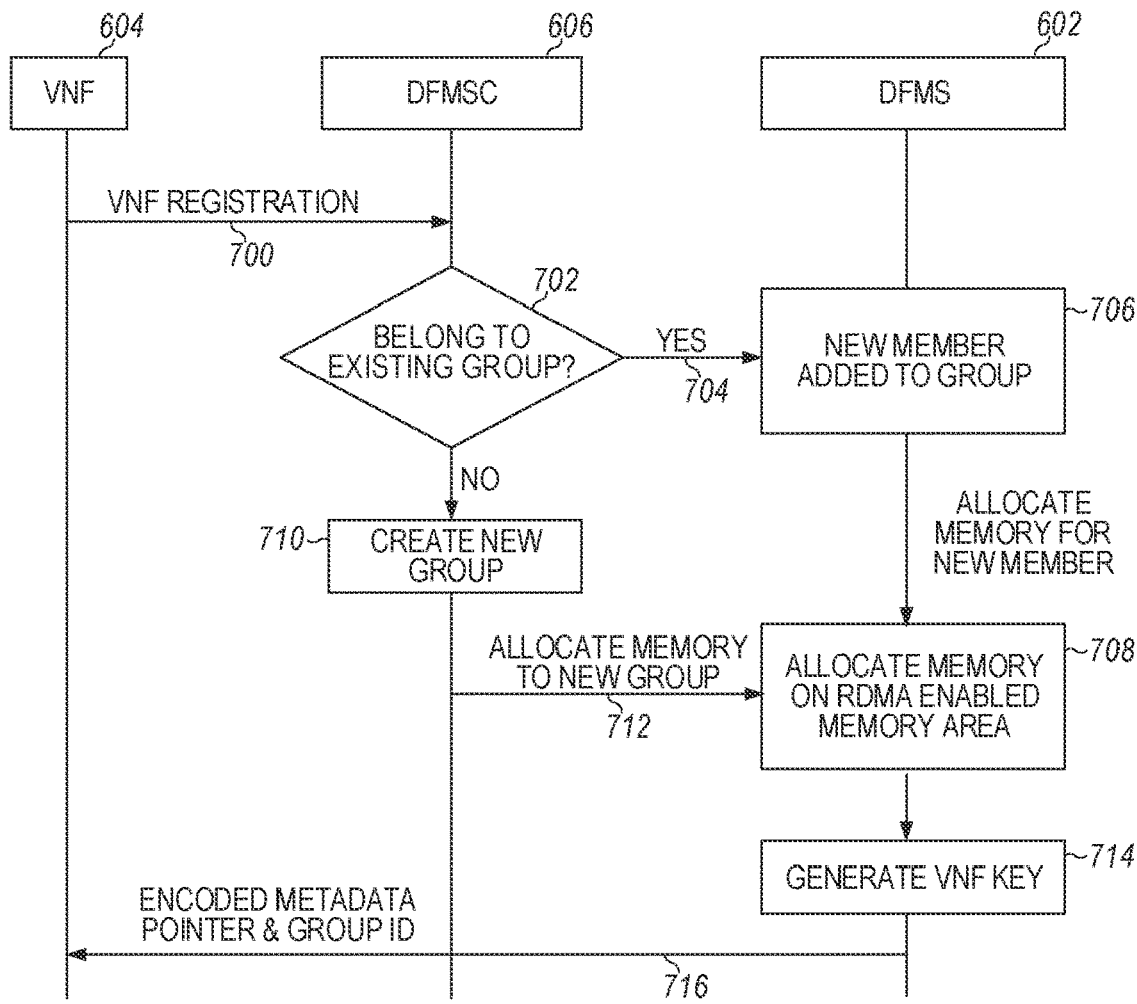
FIG. 7 illustrates a flow diagram of interactions among the VNF, distributed forwarding and metadata sharing (DFMS) framework, and DFMS Controller in a sample embodiment.

FIG. 7 illustrates a flow diagram of interactions among the VNFs 604, DFMS framework 602, and DFMS controller 606 in a sample embodiment. As illustrated for the case of a VNF 604 joining a single VNF group, a VNF 604 first registers with the DFMS Controller 606 at 700. If it is determined by the DFMS Controller 606 at 702 that the VNF 604 is part of an existing VNF group (e.g., a VNF group having shared features, e.g. the VNFs 604 are operating on the same tenant), the DFMS Controller 606 sends an add new member request 704 to the DFMS 602 to add the new VNF 604 to the existing VNF group at 706. The DFMS Controller 606 obtains the relationships of VNFs 604 at a portal as well as the assigned security level for the VNF group(s) to which the VNF 604 is assigned during the setup process. Also, the DFMS 602 allocates RDMA enabled memory for the new member of the existing VNF group at 708. On the other hand, if it is determined at 702 that the registered VNF 604 is not part of any existing VNF group, the DFMS Controller 606 creates a new VNF group at 710 and sends a memory allocation request 712 to the DFMS 602. The DFMS 602 then allocates RDMA enabled memory in an RDMA enabled memory area at 708.

Meanwhile, the DFMS 602 generates a VNF key at 714 and maintains the VNF key for security purposes. The DFMS 602 also encodes the memory pointer for metadata which is allocated to the VNF 604 with the private VNF key and sends the encoded metadata pointer and VNF group ID to the VNF 604 at 716. In operation, the VNF 604 uses the encoded metadata pointer and Group ID (MetaHandle) to request metadata access.

Figure 8:
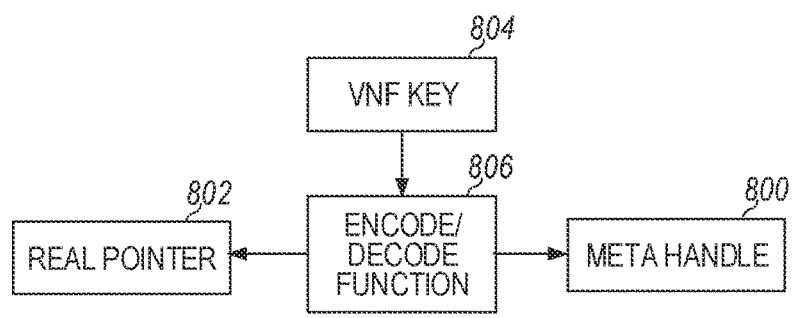
FIG. 8 illustrates a block diagram of the process of creating a MetaHandle (encoded pointer) for use to point to the metadata by a VNF in a sample embodiment.

In sample embodiments, the MetaHandle consists of an encoded pointer to metadata and a cyclic redundancy check (CRC) field generated for the encoded pointer. As illustrated in FIG. 8, a MetaHandle (encoded pointer) 800 for use to point to the metadata by a VNF 604 is formed by encoding the real pointer 802 with the VNF's assigned VNF key 804 at encoder 806. In sample embodiments, the MetaHandle 800 is not assigned at registration of the VNF 604 but is assigned when needed to handle a packet, thereby further improving security. The VNF-KEY 804 is a random key generated for each VNF 604 that is known only (and maintained) by the DFMS 602. The MetaHandle 800 is thus a hashed value of the real pointer 802 and VNF key 804. For example, the MetaHandle 800=(Real Pointer 802) XOR (VNF-KEY 804), and the Real Pointer 802=(MetaHandle 800) XOR (VNF-KEY 804). The MetaHandle 800 is used in communications between the VNF 604 and the DFMS 602 to prevent pointer modifications by other VNFs 604 or attackers, thus providing a significant level of security to the stored metadata. Also, the MetaHandle 800 ensures isolation among VNF groups as the MetaHandle 800 may be used to manage access rights to the metadata 610 to be shared by the VNFs 604 in a VNF group. A VNF 604 also may be registered for multiple VNF groups, where a different VNF ID and MetaHandle 800 is assigned for each VNF group to which the VNF 604 belongs.

Figure 9:
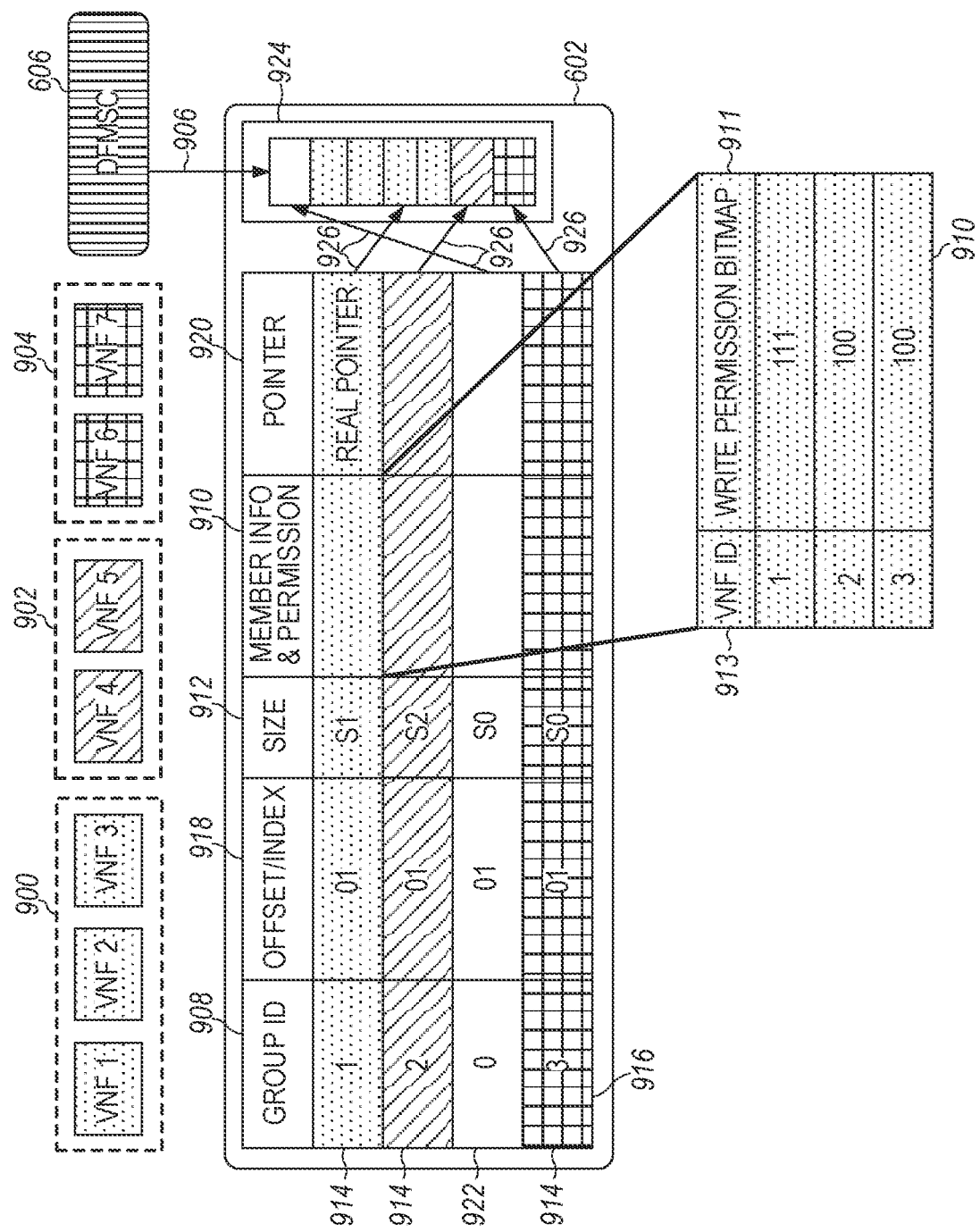
FIG. 9 illustrates an implementation of VNF group management by the DFMS Controller in a sample embodiment.

FIG. 9 illustrates a conceptual diagram of VNF group management by the DFMS Controller 606 in a sample embodiment. As illustrated, the DFMS Controller 606 manages the VNF groups (e.g., 900, 902, 904) by requesting that the DFMS 602 create the VNF groups at 906 and manage VNF group membership. In the embodiment of FIG. 9, the DFMS Controller 606 sends the create group request 906 with group membership information (e.g., group ID) 908, access rights information (e.g., membership based on VNF ID and read/write permissions) 910, and memory size 912 for metadata. As illustrated, the permissions 910 may include a write permission bitmap 911 indicating the access rights for the corresponding VNF 604 identified by the VNF ID 913. The DFMS 602 also creates a table entry 914 in table 916 for the corresponding VNF group 900, 902, 904, etc., where the entry includes group ID 908, offset/index 918 to the RDMA enabled memory area 924, memory size 912, membership and corresponding permission data 910, and the real pointer 920, which is managed by the DFMS 602 as noted above and decoded from the MetaHandle 800 provided by the VNF 604 when the table entry 914 is accessed. Here, Group 0 (922) is used for storing private data/metadata for the DFMS 602, e.g., the private keys 804 for the VNFs 604. Only the DFMS 602 has access to the RDMA enabled memory area 924 for Group 0. As illustrated, the respective table entries 914 are stored in the corresponding allocated memory areas for the VNFs 604 in the RDMA enabled memory area 924 as indicated by the arrows 926. The entries 914 of the table 916 are maintained by DFMS Controller 606.

It will be appreciated that the proposed group management requires the time to access the linear indexed tables of the table 916, including accessing the VNF group ID 908 and membership information and VNF permissions for each VNF group. Processing time is also required to decode the MetaHandle for the VNF 604. However, this management may be done with acceptable overhead processing relative to the benefits of the metadata sharing made possible by implementation of the table 916.

Figure 10:
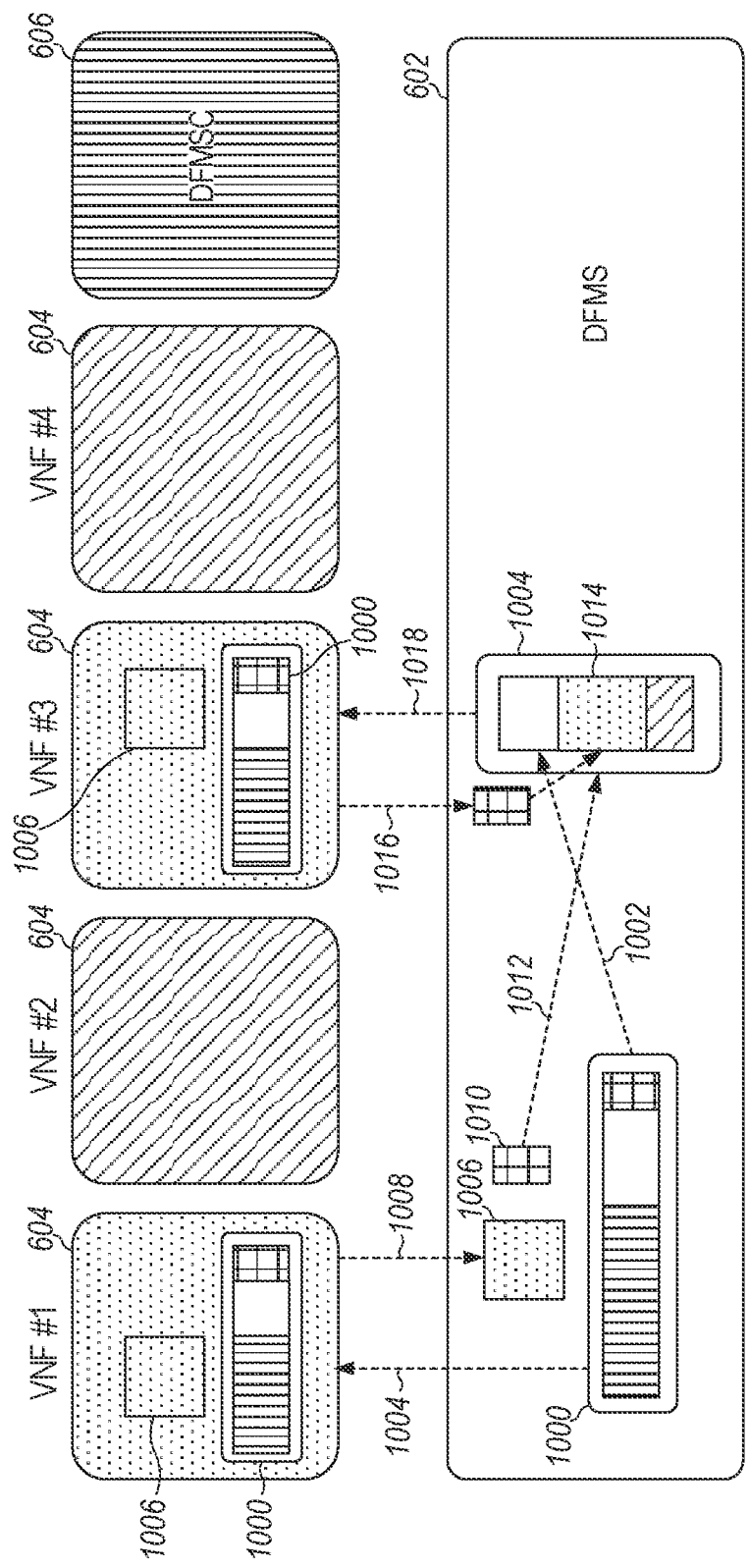
FIG. 10 illustrates a diagram of an example of metadata sharing amongst VNFs using the methods and apparatus described herein.

FIG. 10 illustrates a diagram of an example of metadata sharing amongst VNFs using the methods and apparatus described herein. In the example of FIG. 10, VNF #1 and VNF #3 share the same metadata group (same Group ID) and VNF #2 and VNF #4 share the same metadata group (same Group ID). All VNFs 604 have been registered with the DFMS Controller 606. As illustrated, during operation, a packet 1000 comes into the DFMS 602, and the DFMS 602 allocates the metadata buffer 1004 and writes the private metadata to default group 0 at 1002. In sample embodiments, the packet 1000 includes metadata appended in the header of the packet 1000 whereby the payload of the packet 1000 is not modified. It will be appreciated that the metadata may be removed from the header and replaced by pointers to the metadata. The packet 1000 is then forwarded to VNF #1 at 1004. As VNF #1 has a preallocated metadata group assigned at registration, it sends a request 1006 to the DFMS 602 at 1008 via a Write-to-metadata request, which includes, for example, the MetaHandle, group ID, VNF ID, and metadata to be stored. Upon receiving the request 1006, the DFMS 602 decodes the encoded pointer from the MetaHandle to provide the start address in the table 916, subject to the offset/index 918. The DFMS 602 also performs XOR VNF key operation to extract the real pointer 1010 and provides the real pointer to the table 916 in the metadata buffer 1004 at 1012. Based on the group ID and VNF ID received, the DFMS 602 decides whether VNF #1 has access rights to the metadata group. Since VNF #1 has rights to write the metadata, the DFMS 602 writes the metadata to the allocated memory 1014 in the RDMA enabled memory including metadata buffer 1004 at the location for the corresponding metadata group which is pointed to by the real pointer.

Since VNF #3 shares the same metadata group with VNF #1, VNF #3 may use a Read-to-metadata request 1016, which includes the MetaHandle, group ID, and VNF ID. The DFMS 602 decodes the MetaHandle and returns the stored metadata to VNF #3 at 1018. Since VNF #2 and VNF #4 are in a different group, VNF #2 and VNF #4 may not access the stored metadata.

In the case that a metadata read or write event occurs, the DFMS 602 will notify the DFMS Controller 606 of the events and the DFMS Controller 606 will act accordingly. The DFMS 602 also manages special event occurrences. For example, if a VNF fails, the VNF forwarding graph chain is broken. Depending on the conditions, the DFMS 602 might bypass the failed VNF. On the other hand, if the failed VNF is the VNF that is the one writing the feature set, the entire VNF group may be disabled or inactivated. However, if the failed VNF is the one reading the feature-set, the DFMS 602 might still continue normally.

As another special event occurrence, if a VNF 604 tries to change or access metadata of other VNF groups, the DFMS Controller 606 is informed. In such a case, the VNF 604 attempting the change or access to the metadata of other VNF groups will be blocked or removed from the VNF groups, as appropriate.

Figure 11:
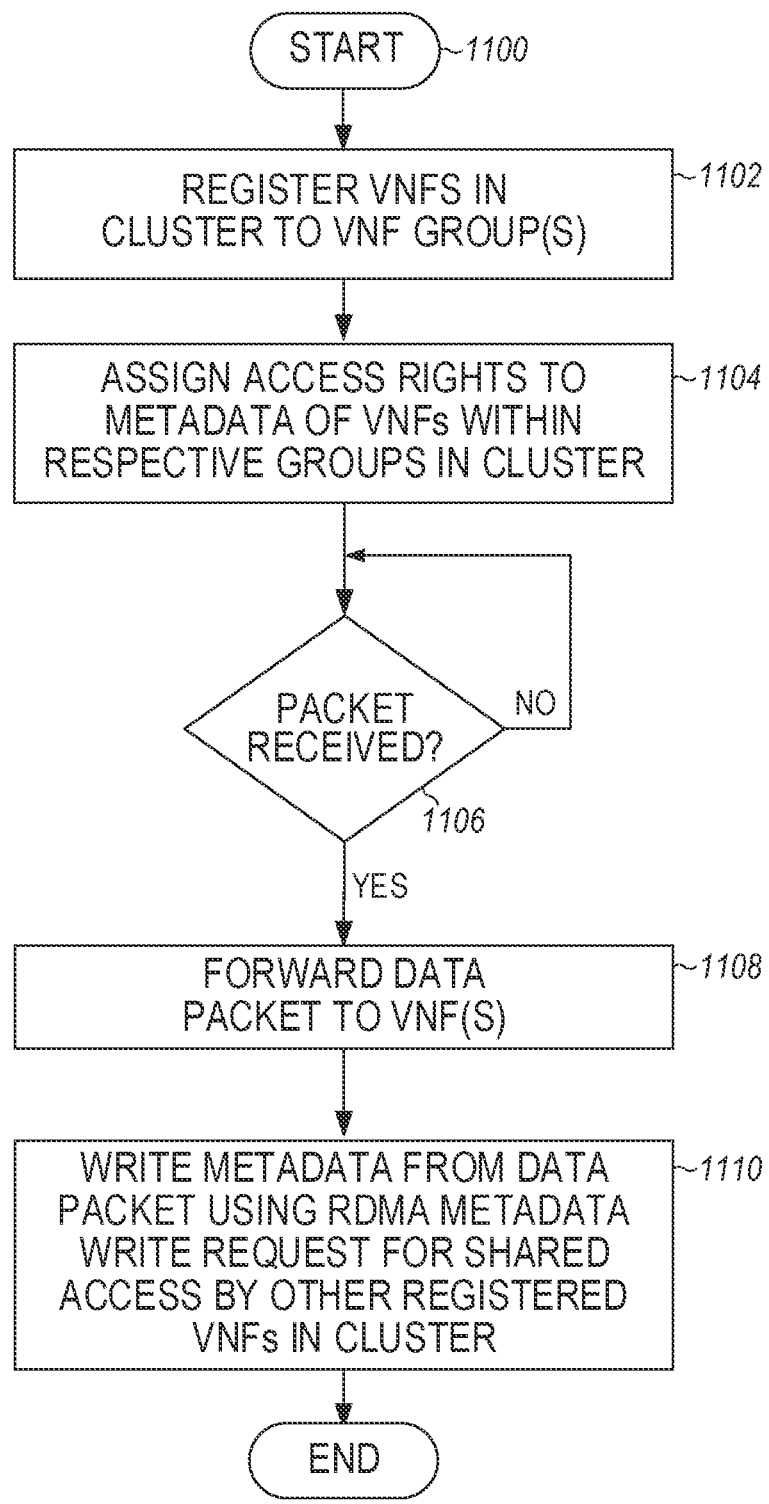
FIG. 11 illustrates a flow diagram of a method of providing RDMA enabled sharing of secured metadata among VNFs from more than one host computer in a cluster of host computers in a sample embodiment.

FIG. 11 illustrates a flow diagram of a method of providing RDMA enabled sharing of secured metadata among VNFs from more than one host computer in a cluster of host computers in a sample embodiment. The method starts at 1100 and the DFMS Controller 606 registers the VNFs 604 in the cluster 608 at 1102 to one or more groups of VNFs in the cluster 608 based on respective features of each VNF 604 in the respective groups in the cluster 608. The DFMS Controller 606 also assigns access rights to the metadata of VNFs 604 within respective groups of VNFs 604 in the cluster 608 at 1104. Then, upon receiving a data packet at 1106, the data packet is forwarded to a VNF 604 at 1108. The metadata for the data packet is written for shared access by other VNFs 604 in a group of VNFs to which the VNF is registered at 1110. In a sample embodiment, writing the metadata includes using an RDMA metadata write request to the group of VNFs in the cluster. As noted above, RDMA enables the metadata to be written across nodes in the cluster. Other VNFs 604 in the group of VNFs 604 in the cluster 608 may then access the metadata stored at the address pointed to by the real pointer by providing a metadata read request including a group ID of the group of VNFs in the cluster, a VNF ID for the other VNF, and the encoded pointer, which is decoded to extract the real pointer to the metadata.

Those skilled in the art will appreciate that the techniques described herein enabling metadata (e.g., timestamps, protocols, application types, etc.) created by VNFs to be stored and shared with other VNFs under certain criteria that assures secure access. The VNFs do not need to be aware of how the metadata is distributed and shared. A VNF group-based metadata management mechanism enables the VNFs to access metadata to which each VNF has permission to access by virtue of its VNF group assignment. The VNG groups enable isolation among tenants to be achieved as well as the sharing of metadata with other VNFs in the same group to enable processing efficiencies. In sample embodiments, RDMA technologies are leveraged to enable metadata sharing across nodes in a cluster of nodes. In addition to improving architecture efficiencies, the metadata sharing among VNFs (as enabled by the systems and methods described herein) provides an effective mechanism for performance monitoring and tracing, which are key components to ensure proper enforcement of service level agreements in a cloud native environment.

Figure 12:
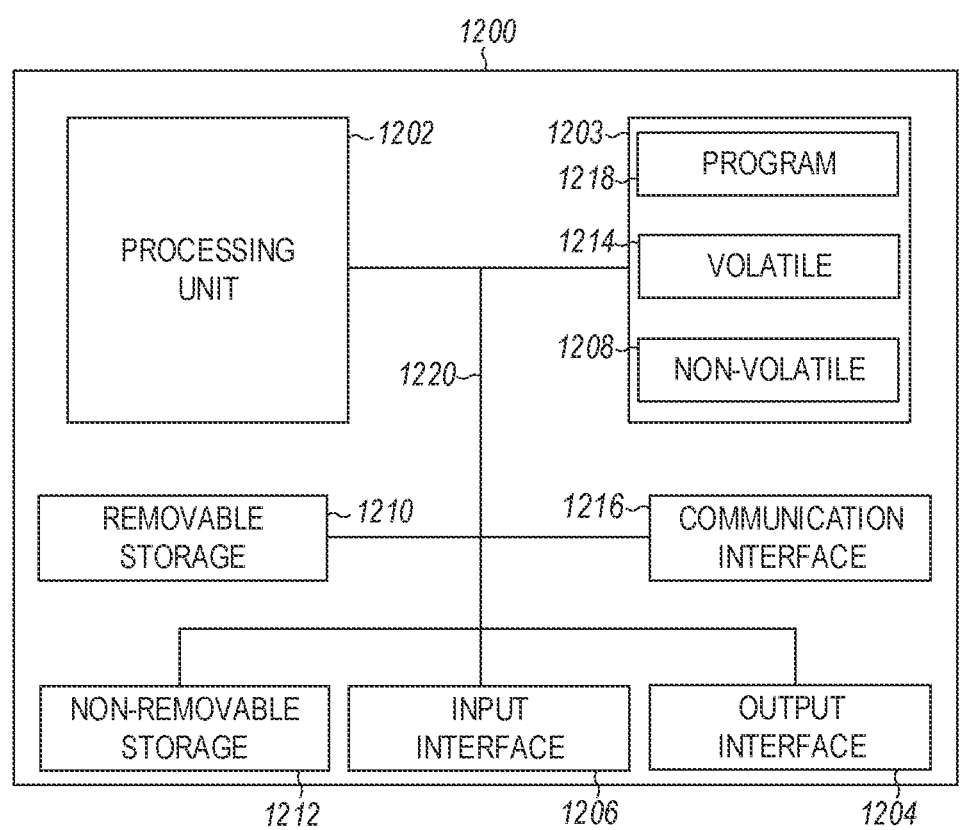
FIG. 12 illustrates a typical, general-purpose network component suitable for implementing one or more embodiments of the apparatus, methods, and computer-readable storage media disclosed herein.

FIG. 12 is a block diagram illustrating circuitry in the form of a processing system for implementing systems and methods of providing RDMA enabled sharing of secured metadata among VNFs from more than one host computer in a cluster of host computers as described above with respect to FIGS. 1-11 according to sample embodiments. All components need not be used in various embodiments. One example computing device in the form of a computer 1200 may include a processing unit 1202, memory 1203, removable storage 1210, and non-removable storage 1212. Although the example computing device is illustrated and described as computer 1200, the computing device may be in different forms in different embodiments. For example, the computing device may instead be a smartphone, a tablet, smartwatch, or other computing device including the same or similar elements as illustrated and described with regard to FIG. 12. Devices, such as smartphones, tablets, and smartwatches, are generally collectively referred to as mobile devices or user equipment. Further, although the various data storage elements are illustrated as part of the computer 1200, the storage may also or alternatively include cloud-based storage accessible via a network, such as the Internet or server-based storage.

Memory 1203 may include volatile memory 1214 and non-volatile memory 1208. Computer 1200 also may include—or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1200 may include or have access to a computing environment that includes input interface 1206, output interface 1204, and a communication interface 1216. Output interface 1204 may include a display device, such as a touchscreen, that also may serve as an input device. The input interface 1206 may include one or more of a touchscreen, touchpad, mouse, keyboard, camera, one or more device-specific buttons, one or more sensors integrated within or coupled via wired or wireless data connections to the computer 1200, and other input devices. Alternatively, in some embodiments the output interface 1204 and the input interface 1206 are combined in a single interface. The computer 1200 may operate in a networked environment using a communication connection to connect to one or more remote computers, which may include a personal computer (PC), server, router, network PC, a peer device or other common DFD network switch, or the like. The communication connection may include a Local Area Network (LAN), a Wide Area Network (WAN), cellular, Wi-Fi, Bluetooth, or other networks. According to one embodiment, the various components of computer 1200 are connected with a system bus 1220.

Computer-readable instructions stored on a computer-readable medium are executable by the processing unit 1202 of the computer 1200, such as a program 1218. The program 1218 in some embodiments comprises software that, upon execution by the processing unit 1202, performs the metadata sharing operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed to be transitory. Storage can also include networked storage, such as a storage area network (SAN). Computer program 1218 also may include instruction modules that upon processing cause processing unit 1202 to perform one or more methods or algorithms described herein.

In an example embodiment, the computer 1200 includes a registration module registering VNFs in the cluster to respective groups of VNFs in the cluster based on respective features of each VNF in the respective groups in the cluster and assigning access rights to the metadata of VNFs within respective groups of VNFs in the cluster, a forwarding module, upon receiving a data packet, forwarding the data packet to a VNF, and a write module writing metadata for the data packet for shared access by other VNFs in a group of VNFs to which the VNF is registered, the writing the metadata comprises using an RDMA metadata write request to the group of VNFs in the cluster. In some embodiments, the computer 1200 may include other or additional modules for performing any one of or combination of steps described in the embodiments. Further, any of the additional or alternative embodiments or aspects of the method, as shown in any of the figures or recited in any of the claims, are also contemplated to include similar modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above with reference to any one or all of steps of the disclosure can be installed in and sold with one or more computing devices consistent with the disclosure. Alternatively, the software can be obtained and loaded into one or more computing devices, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled," and variations thereof are not restricted to physical or mechanical connections or couplings.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code or instructions to perform functions (e.g., by operating on input data and/or generating an output). Method steps can also be performed by, and apparatus for performing the methods can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors 1202, such that the instructions, upon execution by one or more processors 1202 cause the one or more processors 1202 to perform any one or more of the methodologies described herein. Accordingly, a "machine-readable medium" refers to a single storage apparatus or device, as well as "cloud-based" storage systems that include multiple storage apparatus or devices.

Those skilled in the art will appreciate that while sample embodiments have been described in connection with methods of providing RDMA enabled sharing of secured metadata among VNFs from more than one host computer in a cluster of host computers in a sample embodiment, the disclosure described herein is not so limited. For example, the techniques described herein may be used to share metadata across virtual machines as well as containers. Also, memory read/write techniques besides RDMA may be used so long as the read/write techniques do not significantly degrade system performance.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. An apparatus for securely sharing metadata among virtualized network functions (VNFs) disposed within a cluster of host computers, the apparatus comprising:
   a distributed forwarding and metadata sharing (DFMS) framework that forwards received data packets and provides remote direct memory access (RDMA) enabled sharing of secured metadata among the VNFs from more than one host computer in the cluster of host computers; and
   a DFMS controller in communication with the DFMS framework, the DFMS controller resides in the cluster of host computers as a VNF and registers VNFs in the cluster to at least one group of VNFs in the cluster, assigns access rights to metadata of VNFs within respective groups of VNFs in the cluster, and sends an encoded metadata pointer to a registered VNF for use in requesting metadata access, each registered VNF in a group in the cluster using RDMA requests with the encoded metadata pointer to access the metadata for other registered VNFs in the group in the cluster to which the each registered VNF in the group has access rights.

2. The apparatus of claim 1, wherein the VNFs within the cluster are implemented in containers running on different host computers within the cluster.

3. The apparatus of claim 1, wherein the DFMS controller assigns different access rights to respective VNFs of a group of registered VNFs in the cluster to the metadata of the group of registered VNFs in the cluster.

4. The apparatus of claim 3, wherein the DFMS controller assigns access rights to the metadata of the group of registered VNFs in the cluster when a second VNF is registered to the group of VNFs in the cluster by the DFMS controller.

5. The apparatus of claim 1, wherein the DFMS controller generates a VNF key for a registered VNF in the group in the cluster, encodes a memory pointer for metadata allocated for the registered VNF in the group in the cluster using the VNF key to generate the encoded metadata pointer, and sends the encoded metadata pointer to the registered VNF, where the VNF key is a random key generated for each VNF and known only by the DFMS controller.

6. The apparatus of claim 5, wherein the DFMS framework:
   receives the encoded metadata pointer from the registered VNF; and
   identifies metadata for the registered VNF using the encoded metadata pointer.

7. The apparatus of claim 6, wherein the encoded metadata pointer comprises at least one of a hashed value of a real pointer to the metadata and the VNF key assigned to the VNF, or an exclusive OR function of the VNF key for the VNF and the real pointer to the metadata.

8. The apparatus of claim 1, wherein the DFMS controller registers VNFs in the cluster having shared features to a same group and provides each registered VNF in the same group with a same group ID.

9. The apparatus of claim 1, wherein the DFMS framework creates the at least one group of VNFs within the cluster, manages membership of the at least one group of VNFs based on administrative properties, and adds one or more VNFs to the at least one group of VNFs based on features shared with the at least one group of VNFs.

10. The apparatus of claim 9, wherein the DFMS controller registers VNFs from a same tenant within the cluster to a same VNF group.

11. The apparatus of claim 9, wherein the DFMS controller registers a particular VNF with more than one group of VNFs based on features shared by the particular VNF and the more than one group of VNFs.

12. The apparatus of claim 1, wherein the DFMS controller requests that the DFMS framework create the group and provides group membership information, access right information, and memory size for metadata to the DFMS framework for the group to be created.

13. The apparatus of claim 1, wherein the DFMS framework creates a table entry for each group, the table entry including a group ID, an index, a memory size, group membership, and permission for the group.

14. A computer-implemented method of providing remote direct memory access (RDMA) enabled sharing of secured metadata among virtualized network functions (VNFs) from more than one host computer in a cluster of host computers, comprising:
registering, by a distributed forwarding and metadata sharing (DFMS) controller, VNFs in the cluster to groups of VNFs in the cluster based on features of each VNF in the cluster,
assigning, by the DFMS controller, access rights to metadata of VNFs within the groups of VNFs in the cluster;
sending, by the DFMS controller, an encoded metadata pointer to the registered VNF for use in requesting metadata access; and
forwarding, by the DFMS controller in response to receiving a data packet, the data packet and the encoded metadata pointer to a VNF and writing metadata for the data packet for shared access by other VNFs in a group of VNFs to which the VNF is registered, the writing of the metadata comprising using an RDMA metadata write request to the group of VNFs in the cluster.

15. The method of claim 14, wherein the writing of the metadata comprises:
receiving from the VNF a request to obtain the encoded metadata pointer for the VNF;
decoding the encoded metadata pointer to extract a real pointer to the metadata for the group of VNFs in the cluster;
determining that the VNF has access rights to the metadata of the group of VNFs in the cluster; and
enabling the VNF to write the metadata for access by the group of VNFs at an address pointed to by the real pointer.

16. The method of claim 15, further comprising:
accessing, by another VNF in the group of VNFs, the metadata stored at the address pointed to by the real pointer by providing a metadata read request including a group ID of the group of VNFs in the cluster, a VNF ID for the another VNF, and the encoded metadata pointer, wherein the encoded metadata pointer is decoded to extract the real pointer to the metadata.

17. The method of claim 15, wherein the decoding of the encoded metadata pointer comprises:
extracting the encoded metadata pointer from the data packet; and
decoding the encoded metadata pointer using a VNF key assigned to the VNF by the DFMS controller, the VNF key comprising a random key generated for the VNF that is known only by the DFMS controller.

18. The method of claim 17, wherein the encoded metadata pointer comprises at least one of a hashed value of the real pointer to the metadata and the VNF key assigned to the VNF, or an exclusive OR function of the VNF key for the VNF and the real pointer to the metadata.

19. A non-transitory computer-readable medium storing computer instructions to provide remote direct memory access (RDMA) enabled sharing of secured metadata among virtualized network functions (VNFs) from more than one host computer in a cluster of host computers, that when executed by one or more processors, cause the one or more processors to perform the steps of:
registering VNFs in the cluster to groups of VNFs in the cluster based on features of each VNF in the cluster, assigning access rights to the metadata of VNFs within the groups of VNFs in the cluster, and sending an encoded metadata pointer to the registered VNF for use in requesting metadata access; and
upon receiving a data packet, forwarding the data packet and the encoded metadata pointer to a VNF and writing metadata for the data packet for shared access by other VNFs in a group of VNFs to which the VNF is registered, the writing of the metadata comprising using an RDMA metadata write request to the group of VNFs in the cluster.

20. The non-transitory computer-readable medium of claim 19, wherein the instructions for writing the metadata comprise instructions for:
receiving a VNF request to obtain the encoded metadata pointer for the VNF;
decoding the encoded metadata pointer to extract a real pointer to the metadata for the group of VNFs in the cluster;
determining that the VNF has access rights to the metadata of the group of VNFs in the cluster; and
enabling the VNF to write the metadata for access by the group of VNFs at an address pointed to by the real pointer.

* * * * *